US008718194B2

(12) United States Patent
Doan et al.

(10) Patent No.: US 8,718,194 B2
(45) Date of Patent: May 6, 2014

(54) METHOD AND SYSTEM FOR EFFICIENT CHANNEL ESTIMATION

(75) Inventors: Dung Ngoc Doan, San Diego, CA (US); Tao Luo, San Diego, CA (US); Taesang Yoo, San Diego, CA (US); Yongbin Wei, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 12/955,802

(22) Filed: Nov. 29, 2010

(65) Prior Publication Data

US 2011/0129009 A1 Jun. 2, 2011

Related U.S. Application Data

(60) Provisional application No. 61/265,317, filed on Nov. 30, 2009.

(51) Int. Cl.
*H03K 9/00* (2006.01)

(52) U.S. Cl.
USPC ........... 375/316; 375/219; 375/221; 375/260; 375/262; 375/265; 375/267; 375/340; 375/343; 375/346; 375/350

(58) Field of Classification Search
USPC ......... 375/227, 316, 346, 219, 221, 260, 262, 375/265, 267, 340, 343; 370/203, 204, 205, 370/208, 209, 210
See application file for complete search history.

(56) References Cited

U.S. PATENT DOCUMENTS

| 7,027,519 | B2 | 4/2006 | Bao et al. |
| 7,412,005 | B2 | 8/2008 | Wang et al. |
| 7,433,433 | B2 | 10/2008 | Wilhelmsson et al. |
| 7,689,242 | B2 | 3/2010 | Stirling-Gallacher et al. |
| 2005/0105647 | A1 | 5/2005 | Wilhelmsson et al. |
| 2007/0025460 | A1* | 2/2007 | Budianu et al. ............... 375/260 |
| 2008/0014891 | A1* | 1/2008 | Jin et al. ..................... 455/277.1 |
| 2008/0049814 | A1 | 2/2008 | Jeon |

FOREIGN PATENT DOCUMENTS

EP 1898540 3/2008

OTHER PUBLICATIONS

Dae-Seung Ban, et al., "Adaptive grouping MMSE channel estimation in OFDM-based wireless systems", 2008 14th Asia-Pacific Conference on Communications : (APCC) ; Akihabara, Tokyo, Japan, Oct. 14-16, 2008, IEEE, Piscataway, NJ, USA, Oct. 14, 2008, pp. 1-5, XP031418089, ISBN: 978-4-88552-232-1.
Edfors et al, "OFDM Channel Estimation by Singular Value Decomposition," IEEE Transactions on Communications, 46(7):931-939, (Jul. 1998).
Farzad Foroughi, et al., "Channel estimation for a mobile terminal in a multi-standard environment (LTE and DVB-H)", Signal Processing and Communication Systems, 2009. ICSPCS 2009. 3rd International Conference on, IEEE, Piscataway, NJ, USA, Sep. 28, 2009, pp. 1-9, XP031557888, ISBN: 978-1-4244-4473-1.
International Search Report and Written Opinion—PCT/US2010/058431—ISA/EPO—Apr. 12, 2011.

(Continued)

*Primary Examiner* — Dhaval Patel

(57) ABSTRACT

Aspects of the present disclosure describe an efficient channel estimation algorithm for high-speed processing of dedicated reference signals. The channel estimation algorithm may utilize one or more compressed interpolation matrices. The compressed interpolation matrices may be selected based on the Doppler value and signal to noise ratio (SNR) of the channel.

41 Claims, 10 Drawing Sheets

(56) References Cited

OTHER PUBLICATIONS

Ozdemir, Mehmet Kemal et al.: "Channel Estimation for Wireless OFDM systems," XP011186984, IEEE Communications Surveys & Tutorials, ISSN: 1553-877X, 2nd Quarter 2007, 9(2), p. 18-48.

Rana, M. et al. (2010). Low Complexity Downlink Channel Estimation for Lte Systems. 12th International Conference on Advanced Communication Technology (ICACT), 1198-1202.

Taiwan Search Report—TW099141540—TIPO—Dec. 18, 2013.

* cited by examiner

METHOD AND SYSTEM FOR EFFICIENT CHANNEL ESTIMATION

CLAIM OF PRIORITY UNDER 35 U.S.C. §119

The present Application for Patent claims priority to U.S. Provisional Application No. 61/265,317, entitled, "Method and System for Dedicated Reference Signal (DRS) Channel Estimation," filed Nov. 30, 2009, assigned to the assignee hereof and expressly incorporated herein by reference.

TECHNICAL FIELD

Certain aspects of the present disclosure generally relate to wireless communications and, more particularly, to an efficient channel estimation algorithm utilizing compressed interpolation matrices.

BACKGROUND

The third Generation Partnership Project (3GPP) Long Term Evolution (LTE) represents a major advance in cellular technology and is the next step forward in cellular 3G services as a natural evolution of Global System for Mobile Communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support well into this decade. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

Physical layer (PHY) of LTE standard is a highly efficient means of conveying both data and control information between an enhanced base station (eNodeB) and mobile user equipment (UE). LTE PHY employs advanced technologies that are new to cellular applications. These include Orthogonal Frequency Division Multiplexing (OFDM) and Multiple Input Multiple Output (MIMO) data transmission. In addition, LTE PHY uses Orthogonal Frequency Division Multiple Access (OFDMA) on the downlink (DL) and Single Carrier—Frequency Division Multiple Access (SC-FDMA) on the uplink (UL). OFDMA allows data to be directed to or from multiple users on a subcarrier-by-subcarrier basis for a specified number of symbol periods.

LTE-Advanced is an evolving mobile communication standard for providing 4G services. Being defined as 3G technology, LTE does not meet the requirements for 4G also called International Mobile Telecommunications-Advanced (IMT-Advanced) as defined by the International Telecommunication Union such as peak data rates up to 1 Gbit/s. Besides the peak data rate, LTE-Advanced also targets faster switching between power states and improved performance at the cell edge.

SUMMARY

Certain aspects of the present disclosure provide a method for wireless communications. The method generally includes determining a first signal to noise ratio (SNR) value for a received signal, selecting, based on the first SNR value, a first matrix from one or more compressed interpolation matrices, wherein each of the compressed interpolation matrices corresponds to a subset of symbols in a subframe, and obtaining a first channel estimation matrix utilizing the received signal and the first matrix.

Certain aspects of the present disclosure provide an apparatus for wireless communications. The apparatus generally includes means for determining a first signal to noise ratio (SNR) value for a received signal, means for selecting, based on the first SNR value, a first matrix from one or more compressed interpolation matrices, wherein each of the compressed interpolation matrices corresponds to a subset of symbols in a subframe, and means for obtaining a first channel estimation matrix utilizing the received signal and the first matrix.

Certain aspects of the present disclosure provide an apparatus for wireless communications. The apparatus generally includes logic for determining a first signal to noise ratio (SNR) value for a received signal, logic for selecting, based on the first SNR value, a first matrix from one or more compressed interpolation matrices, wherein each of the compressed interpolation matrices corresponds to a subset of symbols in a subframe, and logic for obtaining a first channel estimation matrix utilizing the received signal and the first matrix.

Certain aspects of the present disclosure provide an apparatus for wireless communications. The apparatus generally includes at least one processor configured to determine a first signal to noise ratio (SNR) value for a received signal, select, based on the first SNR value, a first matrix from one or more compressed interpolation matrices, wherein each of the compressed interpolation matrices corresponds to a subset of symbols in a subframe, and obtain a first channel estimation matrix utilizing the received signal and the first matrix, and a memory coupled to the at least one processor.

Certain aspects provide a computer-program product for wireless communications, comprising a computer-readable medium having instructions stored thereon, the instructions being executable by one or more processors. The instructions generally include instructions for determining a first signal to noise ratio (SNR) value for a received signal, instructions for selecting, based on the first SNR value, a first matrix from one or more compressed interpolation matrices, wherein each of the compressed interpolation matrices corresponds to a subset of symbols in a subframe, and instructions for obtaining a first channel estimation matrix utilizing the received signal and the first matrix.

DETAILED DESCRIPTION

Figure 1:
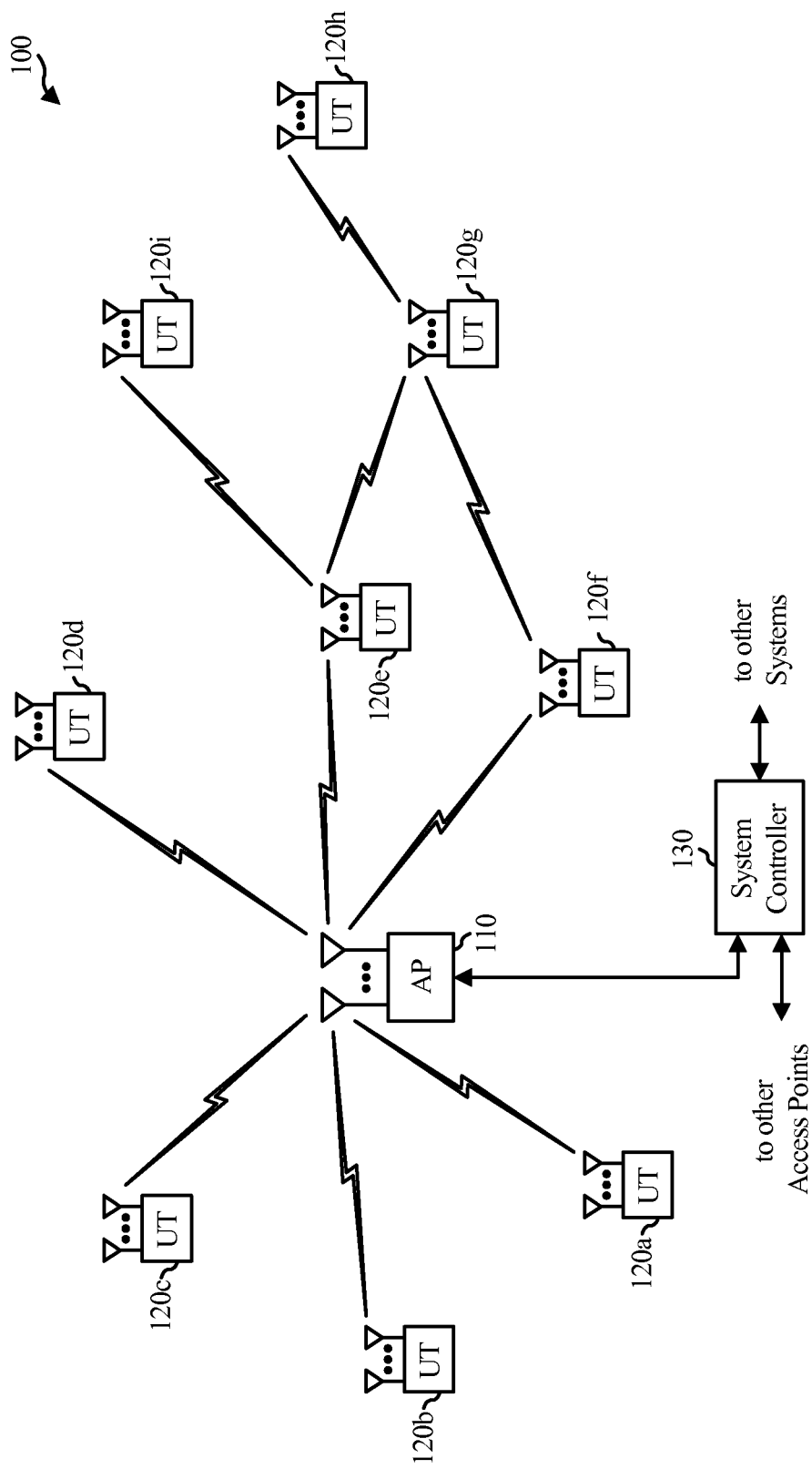
FIG. 1 illustrates a diagram of a wireless communications network, in accordance with certain aspects of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. It should be noted that LTE terminology is used by way of illustration and the scope of the disclosure is not limited to LTE.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ratio (PAPR) because of its inherent single carrier structure. SC-FDMA may be used in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

An Example MIMO System

FIG. 1 illustrates a multiple-access MIMO system 100 with access points and user terminals. For simplicity, only one access point 110 is shown in FIG. 1. An access point (AP) may be a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). Each of the user terminals or the access point may estimate communications channels using dedicated reference signals.

Figure 2:
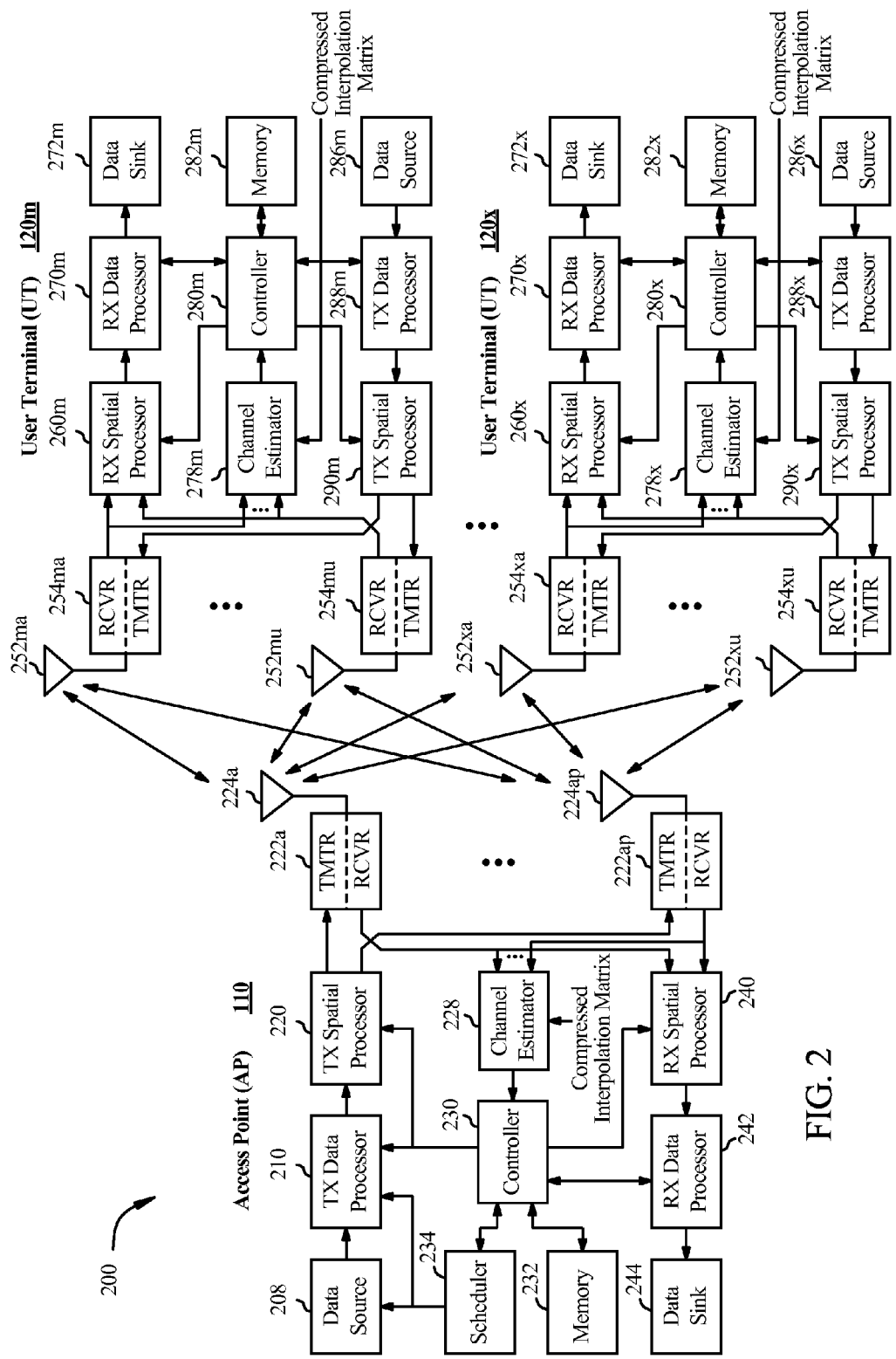
FIG. 2 illustrates a block diagram of an example access point and user terminals, in accordance with certain aspects of the present disclosure.

FIG. 2 shows a block diagram 200 of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$, antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_A$ user terminals are selected for simultaneous reception on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, for example, user terminal 120m, a TX data processor 288 receives traffic data from a data source 286 and control data from a controller 280. The controller 280 may be coupled with a memory 282. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream.

A channel estimator 228 may perform channel estimation on the received signals. The channel estimator 228 may utilize a channel estimation algorithm utilizing compressed interpolation matrices, as described in further detail in the rest of the document. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, for example, user terminal 120m, $N_{ut,m}$ antennas 252 receive the $N_{ap}$ downlink signals from access point 110. Each receiver unit (RCVR) 254 processes a received signal from an associated antenna 252 and provides a received symbol stream. A channel estimator 278 may perform channel estimation on the received signals. The channel estimator 278 may utilize a channel estimation algorithm utilizing compressed interpolation matrices, as described in further detail in the rest of the document. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the channel correlation matrix inversion (CCMI), minimum mean square error (MMSE), or some other technique. An RX data processor 270 processes (e.g., demodulates, deinterleaves, and decodes) the recovered downlink data symbol stream to obtain decoded data for the user terminal. The decoded data for each user terminal may be provided to a data sink 272 for storage and/or a controller 280 for further processing.

Figure 3:
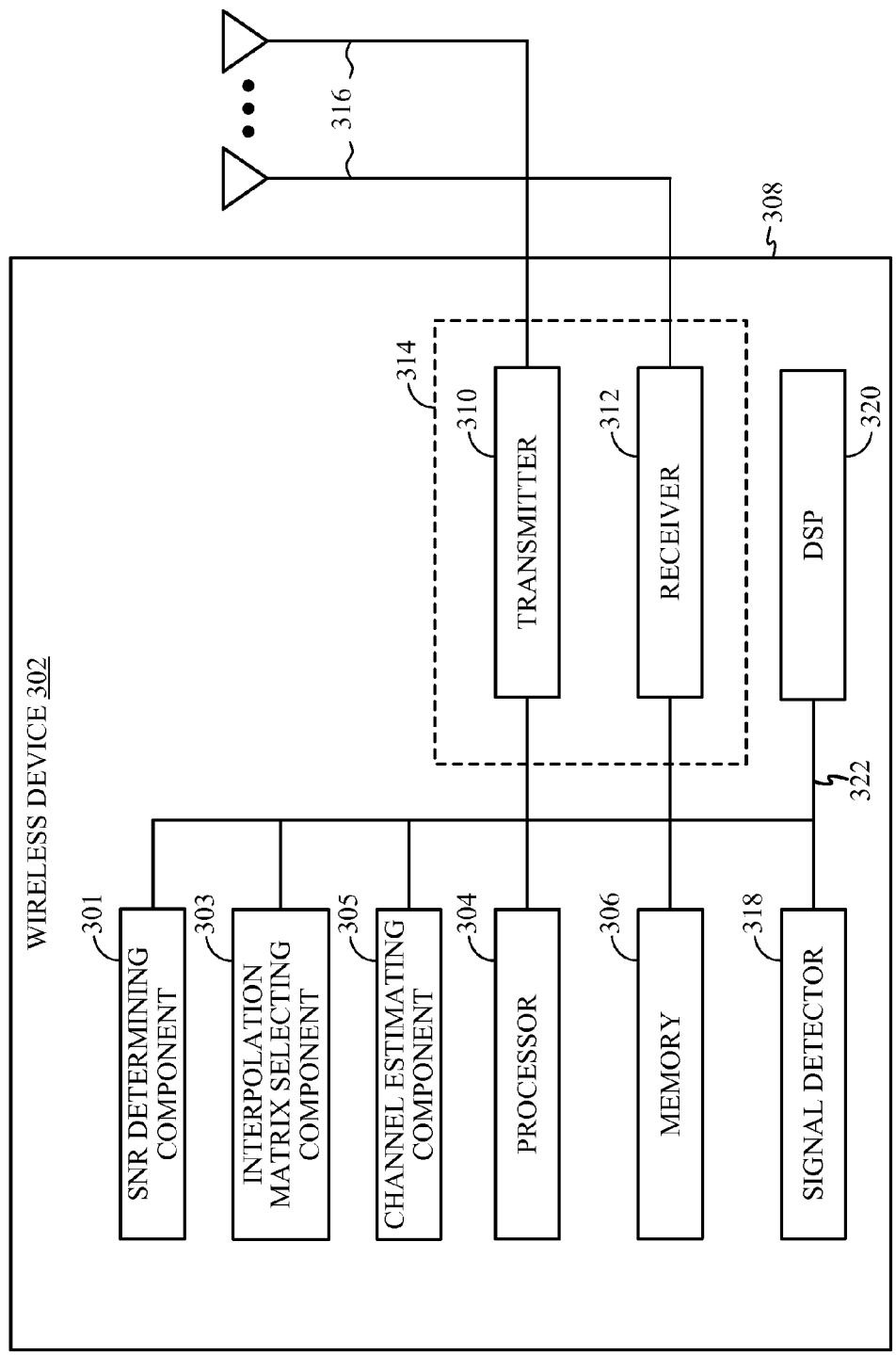
FIG. 3 illustrates a block diagram of an example wireless device, in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure describe an efficient channel estimation algorithm for high-speed processing of dedicated reference signals. The channel estimation algorithm may utilize one or more compressed interpolation matrices. The compressed interpolation matrices may be selected based on the Doppler value and SNR of the channel.

Referring back to the FIG. 3, the wireless device 302 may include a signal to noise ratio determining component 301 for determining signal to noise ratio of a received signal, an interpolation matrix selecting component 303 for selecting a compressed interpolation matrix, and a channel estimating component 305 for estimating a channel using the received signal and the compressed interpolation matrix.

Figure 4:
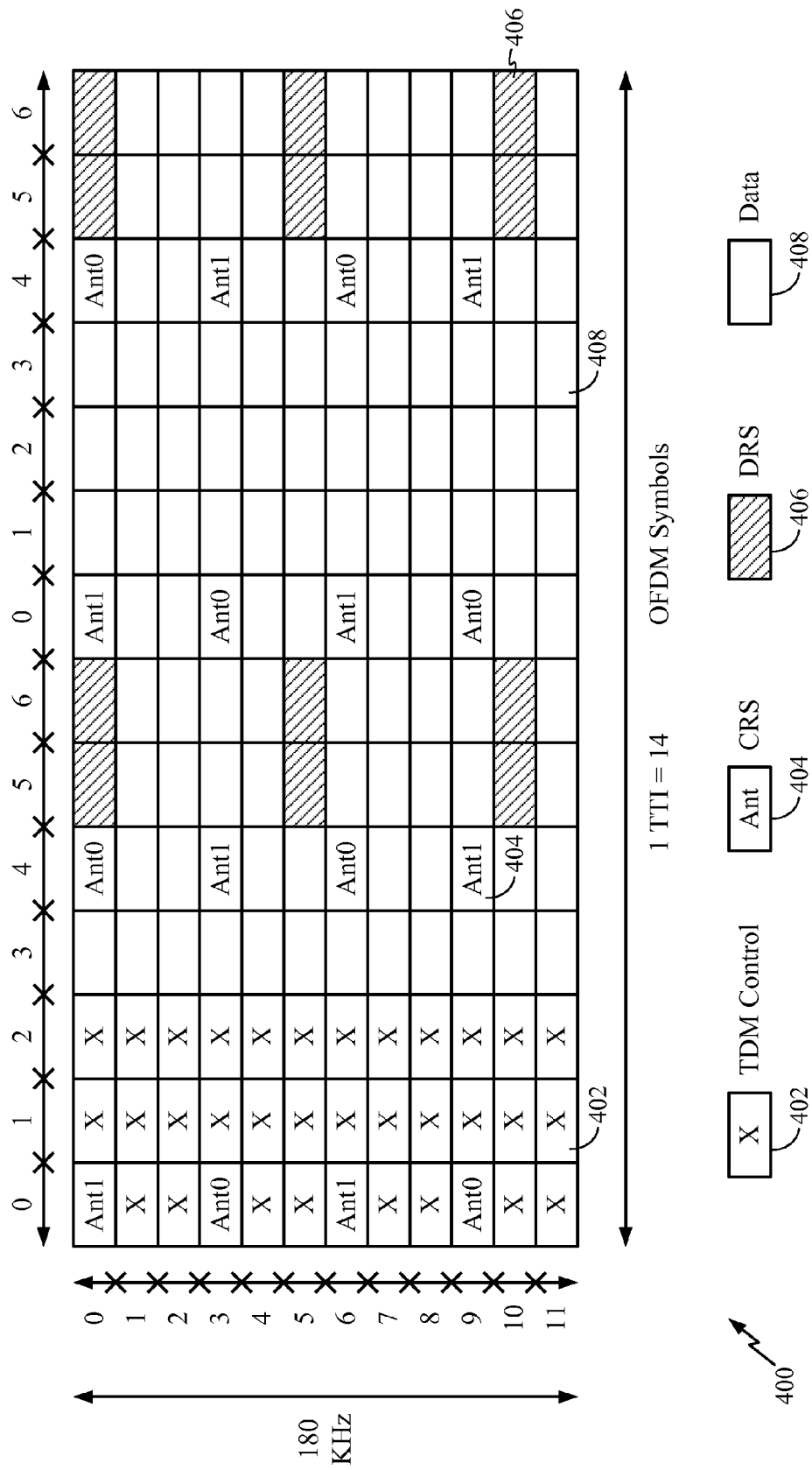
FIG. 4 illustrates an example grid structure comprising Dedicated Reference Signals (DRSs), in accordance with certain aspects of the present disclosure.

FIG. 4 illustrates an example grid structure 400 that may include symbols utilized for transmission of Dedicated Reference Signals (DRS). The grid structure may comprise a Physical Resource Block (PRB) over a subframe. For example, the PRB may include 12 subcarriers and the subframe may include 14 OFDM symbols. The grid structure illustrates code division multiplexing (spreading) in time domain. As shown, the OFDM symbols may comprise Time Division Multiplexing (TDM) control symbols 402, cell-specific or Common Reference Signals (CRSs) 404, DRS signals 406 and data 408. As shown, the DRS signals 406 may be transmitted over a few symbols in the grid with a predetermined pattern. The DRS signals may be used by the receiver to estimate the channel.

In general, a receiver may perform per-grid channel estimation or noise (e.g., $N_t$) estimation using a channel estimation algorithm such as a two dimensional minimum mean square error (2D-MMSE) algorithm. In the 2D-MMSE algorithm, a channel estimation for all tones within a grid ($\underline{H}_{hat}$) may be calculated as follows:

$$\underline{H}_{hat} = \underline{w} \cdot \underline{y}_P$$

in which w comprises an interpolator matrix with size $N_{grid} \times N_P$, wherein $N_{grid}$ represents size of the grid. In the example illustrated in FIG. 4, grid size is equal to 12×14=168. In addition, $N_P$ represents number of DRS tones per grid, and wherein $y_P$ represents a DRS received signal of size $N_P \times 1$. It is noted that the interpolation matrix w may be function of the estimated Path Delay Profile (PDP), the estimated Doppler, or reference signal patterns.

Certain aspects of the present disclosure include utilizing reduced size interpolation matrices in a channel estimation algorithm such as 2D-MMSE. Therefore, complexity of the channel estimation algorithm and the required storage may be reduced. The reason for reduced complexity may be multiplying smaller matrices compared to a system utilizing full-size interpolation matrices.

For certain aspects, instead of utilizing a full size interpolation matrix, a compressed interpolation matrix may be used in a channel estimation algorithm (e.g., 2D-MMSE) with minimal performance degradation. For example, size of the full-size matrix may be equal to 168×12 and size of the compressed interpolation matrix may be equal to 48×12 (e.g., a compression factor of 4). Generally, the full-size interpolation matrix may be calculated on the fly. A compressed interpolation matrix may also be calculated on the fly, or it may be calculated in advance and stored in a memory inside a device.

For certain aspects, a plurality of compressed interpolation matrices may be stored in the memory, corresponding to K different Doppler values (or different ranges of Doppler values) and S different SNR values. For example, for K=4 and S=5, twenty compressed interpolation matrices may be defined. The Doppler steps may include a low Doppler range comprising speeds less than 30 kmh; first middle Doppler range comprising speeds greater than or equal to 30 kmh and less than or equal to 60 kmh; second middle Doppler range comprising speeds greater than 60 kmh and less than or equal to 120 kmh; and a high Doppler range comprising speeds greater than 120 kmh. Also, five different SNR steps may be considered, such as 5 dB, 10 dB, 15 dB, 20 dB, and 25 dB.

In the above example, the memory required to store the compressed interpolation matrices may be calculated as follows:

$$K \times S \times R \times N_{DRS} \times N_{bits} = 4 \times 5 \times 48 \times 12 \times 32 = 360 \text{ Kbits}$$

in which $N_{DRS}$ represents number of dedicated reference signals, and R represents number of rows of the compressed interpolation matrix.

Figure 5:
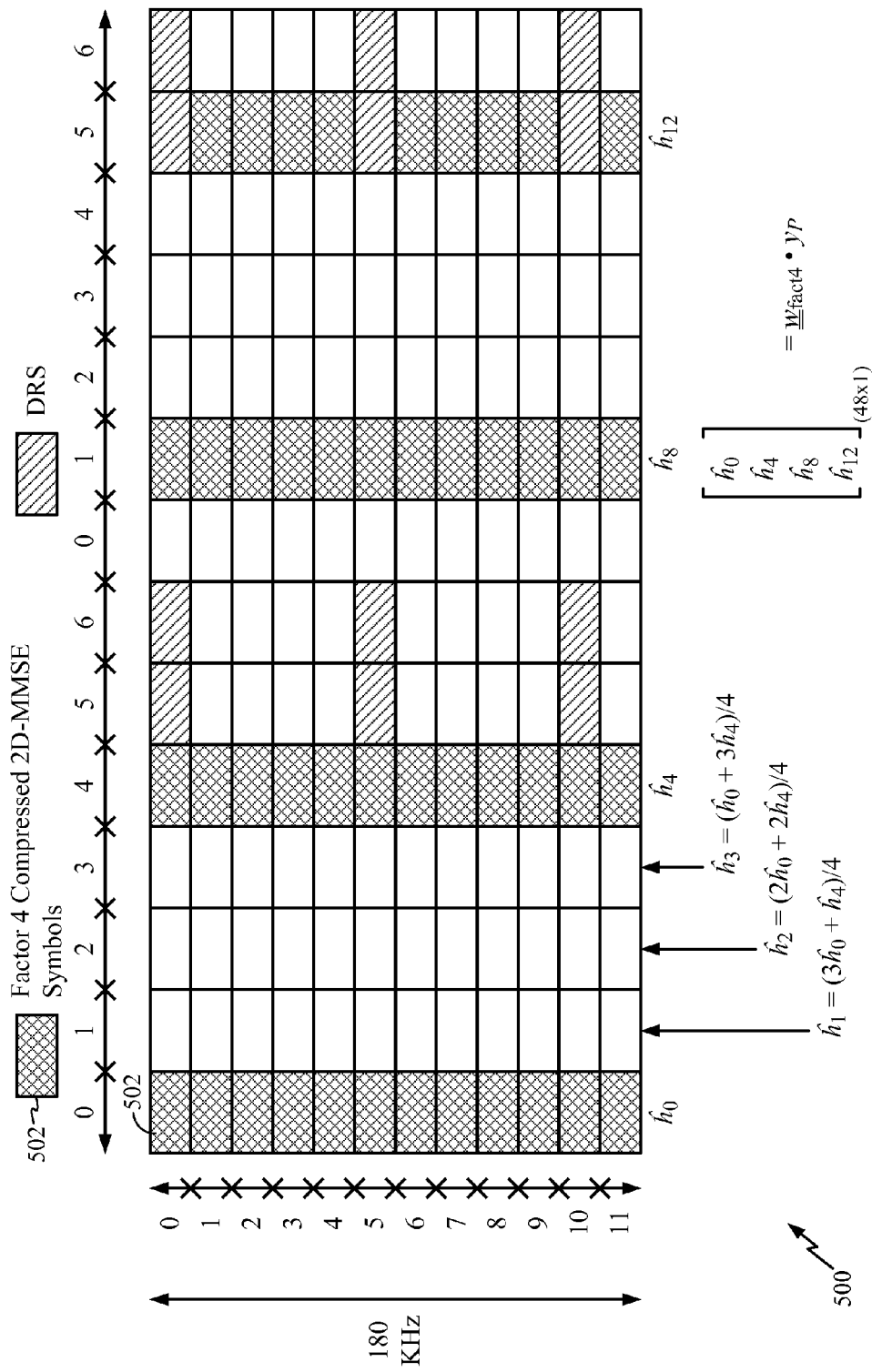
FIG. 5 illustrates an example grid structure corresponding to a factor four compressed 2D-MMSE interpolation matrix, in accordance with certain aspects of the present disclosure.

FIG. 5 illustrates an example grid structure 500 corresponding to a factor four compressed 2D-MMSE interpolator, in accordance with certain aspects of the present disclosure. As illustrated, the grid structure may include 14 OFDM symbols in a subframe over 12 subcarriers. Channel vector $\hat{h}_i$, i=0, . . . , 13 may be a 12×1 vector corresponding to channel estimations for the $i^{th}$ OFDM symbol for different subcarriers (e.g., 12 subcarriers). Information corresponding to a subset of symbols 502 may be included in a compressed interpolator matrix $w_{fact4}$. For example, the compressed interpolator matrix $\underline{w}_{fact4}$ may comprise information about a subset of OFDM symbols (e.g., the symbols corresponding to channels $\hat{h}_0$, $\hat{h}_4$, $\hat{h}_8$ and $\hat{h}_{12}$). The channels $\hat{h}_0$, $\hat{h}_4$, $\hat{h}_8$ and $\hat{h}_{12}$ may be estimated based on $w_{fact4}$ and $y_p$ utilizing a channel estimation algorithm (e.g., 2D-MMSE) as follows:

$$\begin{bmatrix} \hat{h}_0 \\ \hat{h}_4 \\ \hat{h}_8 \\ \hat{h}_{12} \end{bmatrix} = \underline{w}_{fact4} \cdot y_p$$

Channel values corresponding to other symbols in the subframe may be derived by interpolation. For example, $h_1$, $h_2$ and $h_3$ may be calculated as follows:

$$\hat{h}_1 = (3\hat{h}_0 + \hat{h}_4)/4$$

$$\hat{h}_2 = (2\hat{h}_0 + 2\hat{h}_4)/4$$

$$\hat{h}_3 = (\hat{h}_0 + 3\hat{h}_4)/4$$

Channel estimation algorithms such as MMSE may need an estimation of signal to noise ratio (SNR), for example, to calculate a correlation matrix. The SNR may be dependent on Doppler speed and/or type of the channel (e.g., Single User (SU)-MIMO Rank2, SU-MIMO Rank1, Multiuser (MU)-MIMO). For example, for SU-MIMO Rank2, differential in time of de-spreaded signals may be used. In addition, noise variance $\sigma^2$ may be calculated based on the following equation:

$$\sigma^2 = 0.5E\{|y_p(k,n_1) - y_p(k,n_{i+1})|^2\}$$

wherein k may represent frequency index, n may represent time index and E(x) may be the expected value of x.

In another example, for SU-MIMO Rank1 or MU-MIMO, the noise variance may be estimated by calculating power of a co-channel de-spreaded signal. For certain aspects, SNR may be calculated for each PRB and averaged over a plurality of PRBs.

For certain aspects, noise ($N_t$) may also be estimated based on channel estimation values, as follows:

$$N_t = E\{|r_p(k,n) - \hat{h}_p(k,n)|^2\}$$

in which r (k,n) may be received DRS signal and $\hat{h}_p$(k,n) may be spreaded channel estimation value. The estimated channel may contain some bias. However, the performance loss may be negligible even if the bias is not removed.

For certain aspects of the present disclosure, SNR may be estimated utilizing different methods. For lower speeds (e.g., speeds less than 60 kmh), SNR may be estimated by differentiating DRS signals in time domain. At mid to high speeds (e.g., speeds greater than or equal to 60 kmh), estimation of SNR based only on differentiating DRS signals in time may be unreliable. Therefore, for speeds greater than or equal to 60 kmh, six exemplary approaches for SNR estimation are explained in further detail below.

For certain aspects, SNR may be estimated from common reference signals (CRS). For example, a receiver may utilize power delay profile (PDP) and/or Channel Quality Indicator (CQI) feedback for SNR estimation. However, the SNR estimation utilizing the PDP may be inaccurate due to narrow band interference from other cells. Also, the CQI feedback may not include knowledge of the SNR.

For certain aspects, mapping of the current Modulation Coding Scheme (MCS) maybe used to estimate SNR. The MCS may be optimized for a matching MCS table. However, one potential drawback of this scheme is that an evolved Node B (eNB) may decide which MCS is to be used that may be different from an MCS suggested by the UE.

For certain aspects, a predefined, fixed value (e.g., 20 dB) may be used instead of an estimated SNR. In another aspect, a measured SNR value may be compared to a predefined threshold value. Based on the comparison, if the measured SNR is smaller than the predefined threshold, the SNR may be set to a predefined low value (e.g., 10 dB). If the measured SNR is greater than or equal to the predefined threshold, the SNR may be set to a predefined high value (e.g., 20 dB). The measured SNR may be calculated by differentiating DRS signals in time domain.

Figure 6:
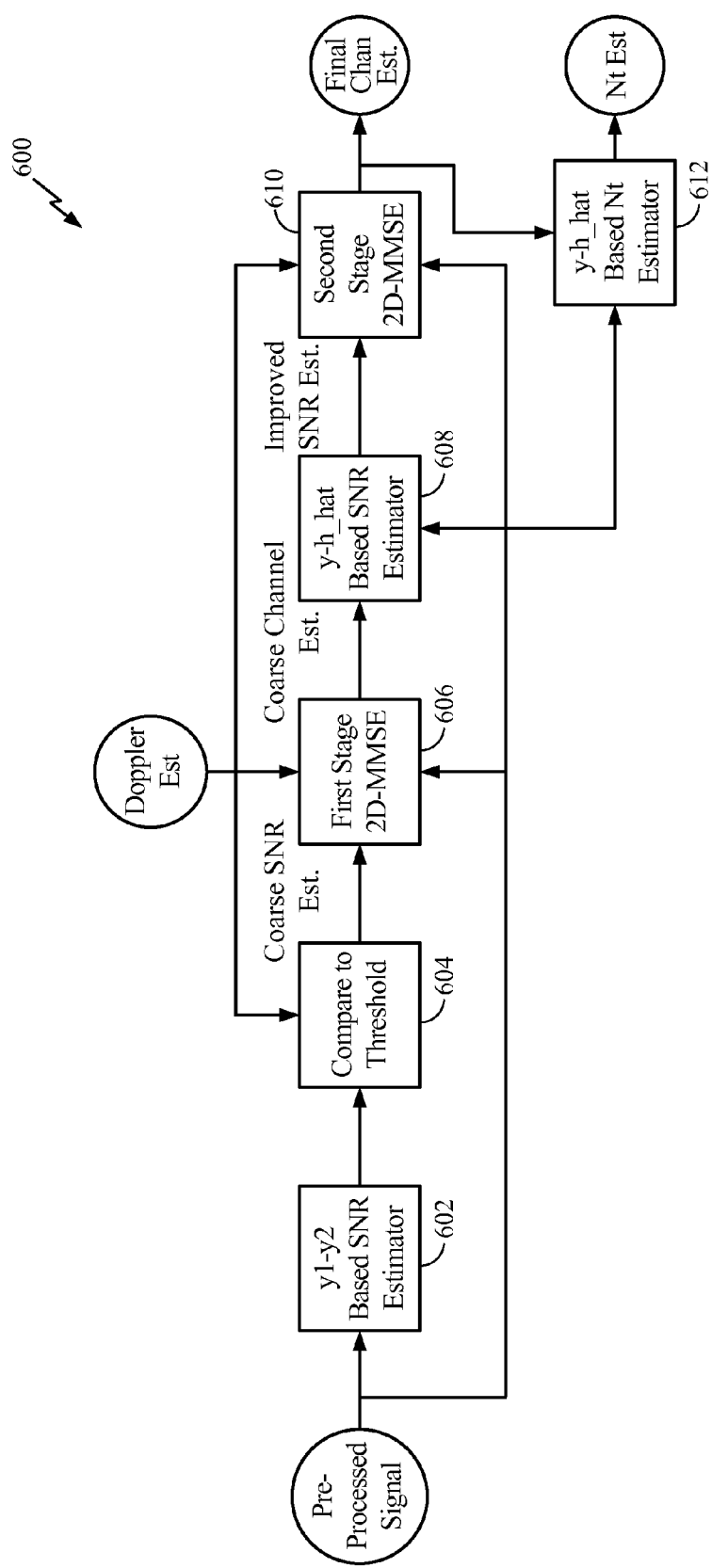
FIG. 6 illustrates a two-stage SNR and channel estimation algorithm, in accordance with certain aspects of the present disclosure.

FIG. 6 shows diagram 600 illustrating a two-stage SNR and channel estimation algorithm, in accordance with certain aspects of the present disclosure. As illustrated, at first stage, a raw SNR value may be estimated using time domain signal differential approach utilizing ($y_1$-$y_2$) based SNR estimator 602, in which $y_1$ and $y_2$ are two consecutive received samples. The raw SNR value may then be compared to a threshold using block 604 to generate a coarse SNR estimate. If the raw SNR is smaller than the threshold, the coarse SNR estimate may be set to a first value (e.g., 10 dB). If the raw SNR is greater than or equal to the threshold, the coarse SNR estimate may be set to a second value (e.g., 20 dB).

The SNR estimate may be used to select a 2D-MMSE interpolator matrix which may be utilized to obtain the first stage channel estimation value utilizing the block first stage 2D-MMSE 606. The block first stage 2D-MMSE may utilize the preprocessed signal and the estimated SNR to generate a coarse channel estimation. The interpolator matrix may be selected based on the speed of the device utilizing a Doppler estimate. The Doppler estimate may also be used in other parts of the system such as the blocks 604 and second stage 2D-MMSE 610. The first stage channel estimation value (e.g., coarse channel estimation) may be used in block y-h_hat SNR estimator 608 to generate an improved SNR estimation.

At the second stage, the improved SNR estimation may be used to select another 2D-MMSE interpolator matrix, which in turn may be used in second stage 2D-MMSE 610 for channel estimation. The estimated channel may be used to estimate noise ($N_t$) in the $N_t$ estimator 612. The estimated channel and noise values may then be fed to other parts of the system (e.g., physical downlink shared channel (PDSCH)) for further processing. The second stage of the channel estimation may be performed only if the difference between the improved SNR estimate and the coarse SNR estimate is equal to or greater than a threshold. It should be noted that the block y-h_hat SNR estimation 608 and the $N_t$ estimator 612 process the pre-processed signal utilizing a channel estimation value. The second stage 2D-MMSE 610 processes the pre-processed signal utilizing the improved SNR estimate value.

Figure 7:
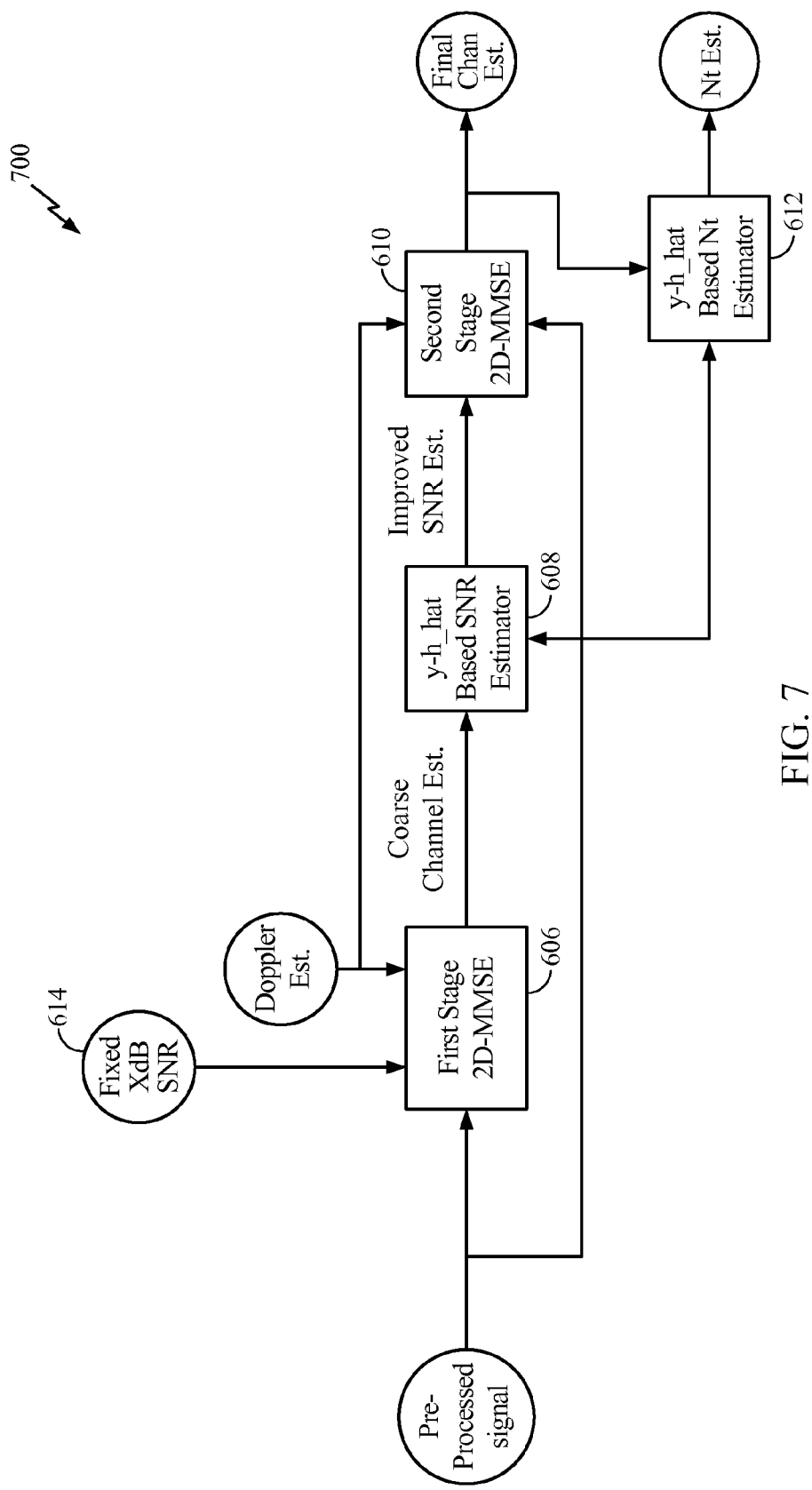
FIG. 7 illustrates a variation of the two-stage SNR and channel estimation algorithm, in accordance with certain aspects of the present disclosure.

FIG. 7 shows diagram 700 illustrating a variation of the two-stage SNR and channel estimation algoritμm, in accordance with certain aspects of the present disclosure. As illustrated, a predefined, fixed value (e.g., 20 dB or 25 dB) may be used as the raw SNR value in the first stage as illustrated in block Fixed SNR 614. Other blocks in FIG. 7 are similar to the blocks illustrated in FIG. 6.

Figure 8:
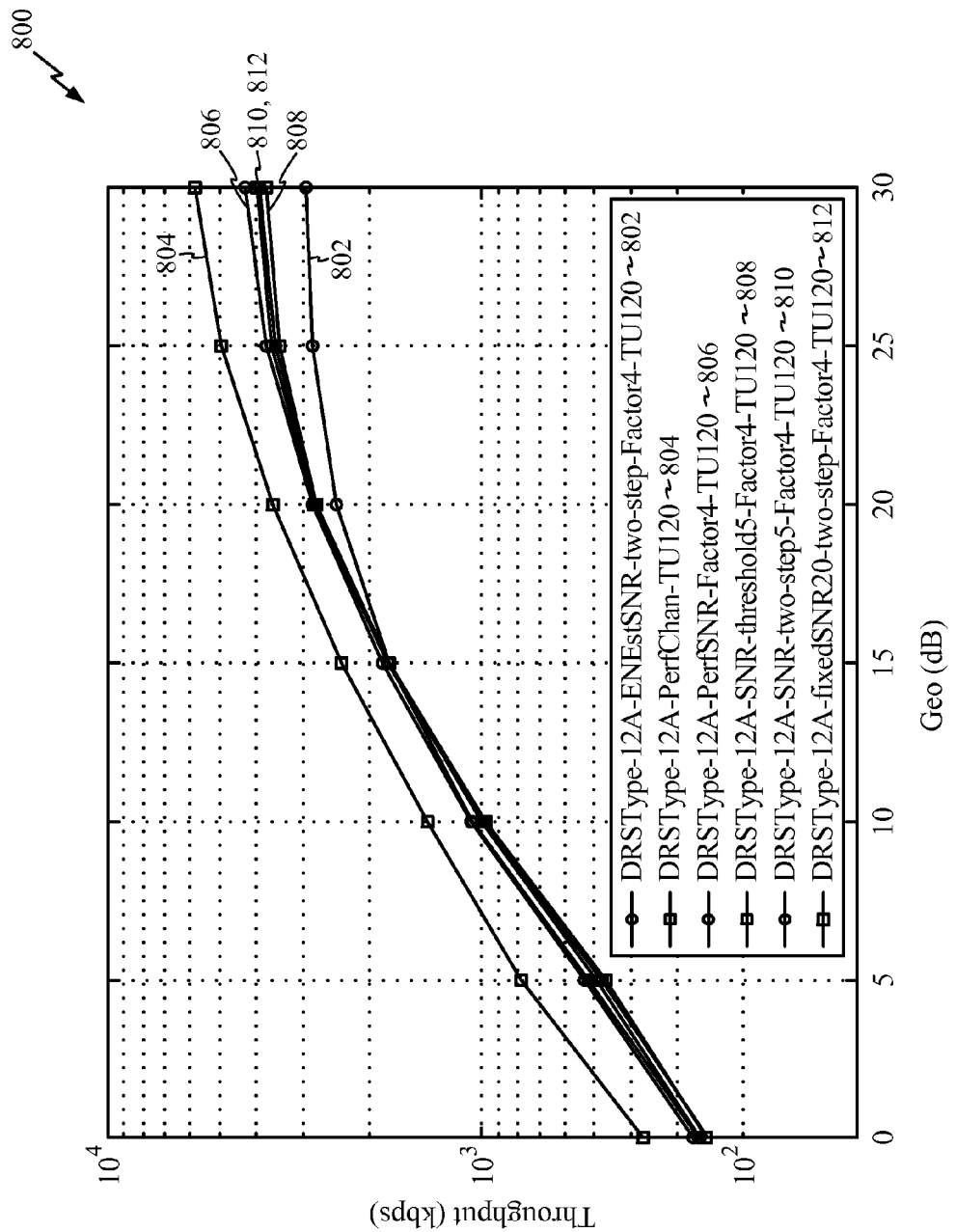
FIG. 8 illustrates throughput of a system utilizing the two-stage channel estimation algorithm, in accordance with certain aspects of the present disclosure.

FIG. 8 shows diagram 800 illustrating throughput of a system utilizing the 2-stage channel estimation algorithm. The system is assumed to have the following characteristics: Typical Urban (TU) 120 kmh channel, bandwidth equal to 10 MHz, carrier frequency equal to 2 GHz, 2×2 Antenna configuration, adaptive modulation and coding, wideband CQI feedback, number of resource blocks (RBs) equal to 6, starting PRB index equal to 6, perfect channel and estimated channel, perfect SNR, perfect estimated SNR and quantized SNR, perfect $N_t$ and estimated $N_t$ and DRS pattern 12A.

In plot 800, curve 802 illustrates the throughput for a system with the two step channel estimation. Curve 804 illustrates a system with perfect channel knowledge. Curve 806 illustrates a system with perfect SNR. Curve 808 illustrates a system with threshold equal to 5 dB. Curve 810 illustrates a system with two step channel estimation. And, curve 812 illustrates a system with a fixed SNR equal to 20 dB and two step channel estimation.

Figure 9:
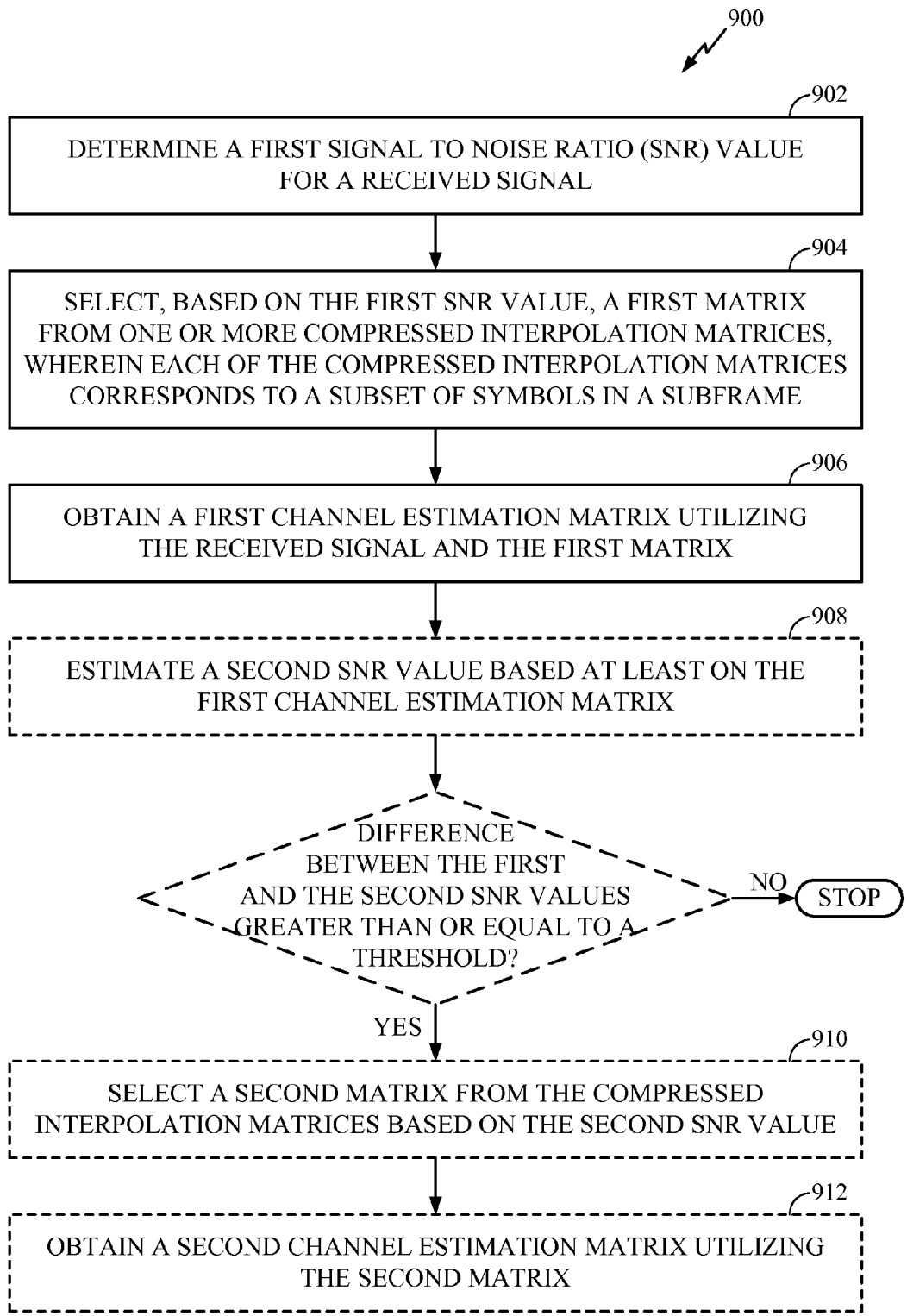
FIG. 9 illustrates example operations for a channel estimation algorithm, in accordance with certain aspects of the present disclosure.

FIG. 9 shows diagram 900 illustrating example operations for a channel estimation algorithm, in accordance with certain aspects of the present disclosure. At 902, a first signal to noise ratio (SNR) value may be determined for a received signal. For example, the first SNR may be determined by comparing a measured SNR value with a threshold value, and selecting a first value if the measured SNR value is equal to or greater than the threshold value and selecting a second value if the measured SNR value is smaller than the threshold value.

At 904, based on the first SNR value, a first matrix may be selected from one or more compressed interpolation matrices, wherein each of the compressed interpolation matrices corresponds to a subset of symbols in a subframe. At 906, a first channel estimation matrix may be obtained utilizing the received signal and the first matrix. At 908, a second SNR value may optionally be estimated based at least on the first channel estimation matrix. If a difference between the first and the second SNR values is equal to or greater than a threshold, at 910, a second matrix may be selected from the compressed interpolation matrices based on the second SNR value. At 912, a second channel estimation matrix may be obtained utilizing the second matrix.

For certain aspects, the first channel estimation matrix may be determined by obtaining a first plurality of channel estimation values corresponding to the subset of symbols, and generating a second plurality of channel estimation values, corresponding to the remaining symbols in the subframe that are not included in the subset, by interpolating the first plurality of channel estimation values. The first channel estimation matrix may then be generated that may include the first and the second plurality of channel estimation values.

Figure 9A:
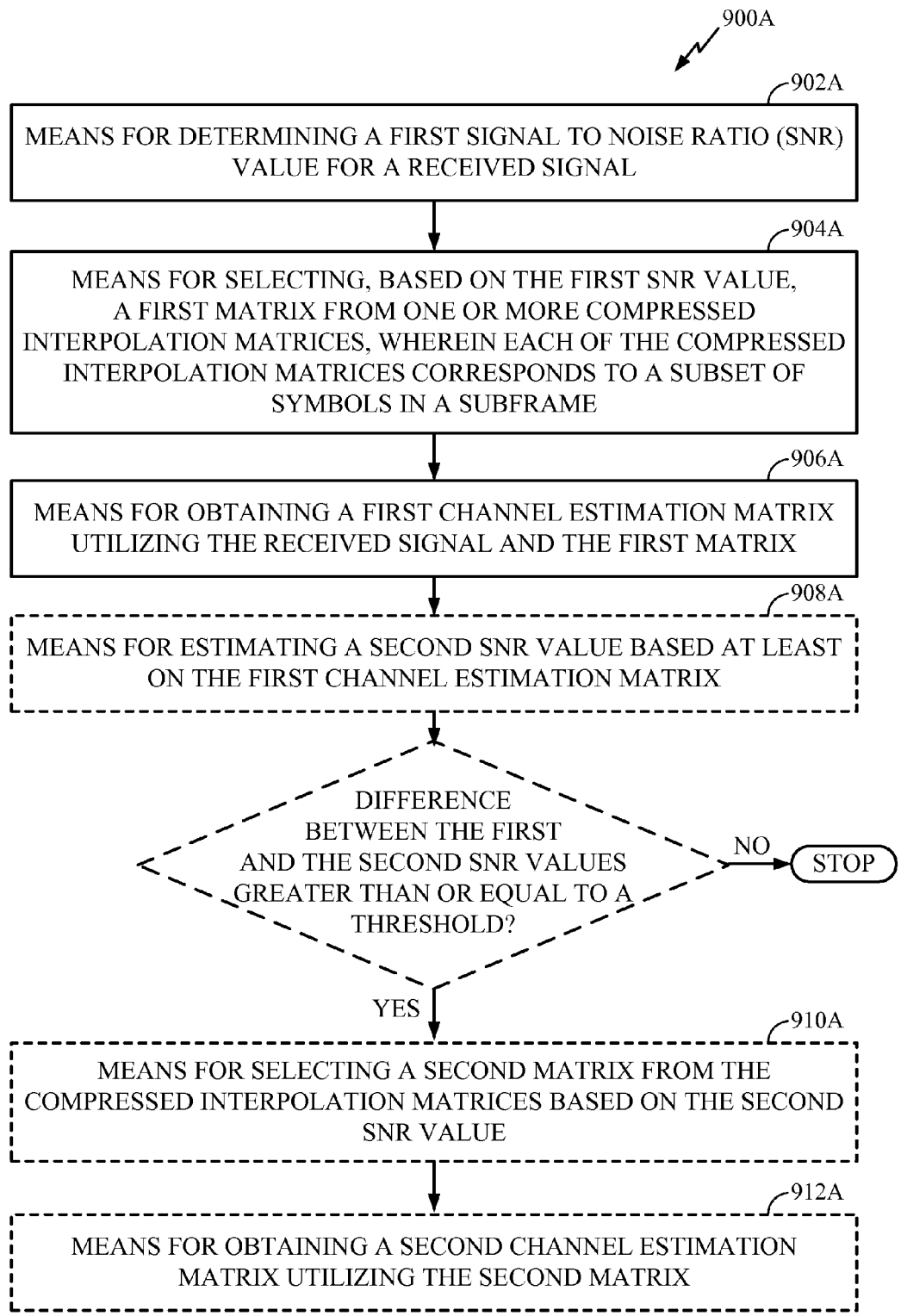
FIG. 9A illustrates example components capable of performing the operations shown in FIG. 9.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 902-912 in FIG. 9 correspond to circuit blocks 902A-912A illustrated in FIG. 9A.

For example, means for determining may comprise any suitable determining component, such as the SNR determining component 301 illustrated in FIG. 3. Means for selecting may comprise any suitable selecting component, such as the interpolation matrix selecting component 303. Means for obtaining may comprise any suitable obtaining component, such as the channel estimating component. These components may be implemented with any suitable components, such as one or more processors, for example, such as the RX data processor 270m and/or controller 280m of the user terminal 120m, or the RX data processor 242 and/or controller 230 of the access point 110 illustrated in FIG. 2.

As used herein, the phrase "at least one of A or B" is meant to include any combination of A and B. In other words, "at least one of A or B" comprises A or B or A and B.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. Unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Various functions described herein may be performed by a processing system. The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry (not shown), and at least a portion of the machine-readable media integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point, an access terminal, a mobile handset, or other type of wireless device with processing logic and elements to perform the techniques provided herein.

While the foregoing is directed to aspects of the present invention, other and further aspects of the invention may be devised without departing from the basic scope thereof, and the scope thereof is determined by the claims that follow.

What is claimed is:

1. A method for wireless communications, comprising:
   determining a first signal to noise ratio (SNR) value for a received signal;
   selecting, based on the first SNR value, a first matrix from one or more two-dimensional compressed interpolation matrices, wherein each of the compressed interpolation matrices corresponds to a subset of physical resource blocks (PRBs) in a subframe, and wherein the size of the compressed interpolation matrices is based on a number of dedicated reference signal (DRS) tones in the subframe and a number of symbols in the subset of PRBs; and
   obtaining a first channel estimation matrix utilizing the received signal and the first matrix.

2. The method of claim 1, wherein obtaining the first channel estimation matrix comprises:

obtaining a first plurality of channel estimation values corresponding to the subset of physical resource blocks (PRBs); and generating a second plurality of channel estimation values, corresponding to remaining PRBs in the subframe that are not included in the subset of PRBs, by interpolating the first plurality of channel estimation values; and generating the first channel estimation matrix comprising the first and the second plurality of channel estimation values.

3. The method of claim 1, further comprising:

estimating a second SNR value based at least on the first channel estimation matrix;

selecting a second matrix from the compressed interpolation matrices based on the second SNR value; and obtaining a second channel estimation matrix utilizing the second matrix.

4. The method of claim 3, further comprising:

comparing the first and the second SNR values and selecting the second matrix only if a difference between the first SNR value and the second SNR value is equal to or greater than a threshold value.

5. The method of claim 1, wherein obtaining the first channel estimation matrix comprises:

obtaining the first channel estimation matrix utilizing a two-dimensional minimum mean square error (2D-MMSE) algorithm.

6. The method of claim 1, wherein determining the first SNR value comprises:

determining the first SNR value utilizing one or more common reference signals.

7. The method of claim 1, wherein determining the first SNR value comprises:

comparing a measured SNR value with a threshold value; and selecting, for the first SNR value, a first value if the measured SNR value is equal to or greater than the threshold value and selecting a second value if the measured SNR value is smaller than the threshold value.

8. The method of claim 1, wherein determining the first SNR value comprises:

utilizing a predefined value for the first SNR value.

9. The method of claim 1, further comprising:

obtaining a Doppler value; and selecting the first matrix further based at least on the Doppler value.

10. The method of claim 1, wherein determining the first SNR value comprises:

determining the first SNR value based on mapping of a modulation and coding scheme.

11. An apparatus for wireless communications, comprising:

means for determining a first signal to noise ratio (SNR) value for a received signal;

means for selecting, based on the first SNR value, a first matrix from one or more two-dimensional compressed interpolation matrices, wherein each of the compressed interpolation matrices corresponds to a subset of physical resource blocks (PRBs) in a subframe, and wherein the size of the compressed interpolation matrices is based on a number of dedicated reference signal (DRS) tones in the subframe and a number of symbols in the subset of PRBs; and means for obtaining a first channel estimation matrix utilizing the received signal and the first matrix.

12. The apparatus of claim 11, wherein the means for obtaining the first channel estimation matrix comprises:

means for obtaining a first plurality of channel estimation values corresponding to the subset of physical resource blocks (PRBs); and means for generating a second plurality of channel estimation values, corresponding to remaining PRBs in the subframe that are not included in the subset of PRBs, by interpolating the first plurality of channel estimation values; and means for generating the first channel estimation matrix comprising the first and the second plurality of channel estimation values.

13. The apparatus of claim 11, further comprising:

means for estimating a second SNR value based at least on the first channel estimation matrix;

means for selecting a second matrix from the compressed interpolation matrices based on the second SNR value; and means for obtaining a second channel estimation matrix utilizing the second matrix.

14. The apparatus of claim 13, further comprising:

means for comparing the first and the second SNR values and selecting the second matrix only if a difference between the first SNR value and the second SNR value is equal to or greater than a threshold value.

15. The apparatus of claim 11, wherein the means for obtaining the first channel estimation matrix comprises:

means for obtaining the first channel estimation matrix utilizing a two-dimensional minimum mean square error (2D-MMSE) algorithm.

16. The apparatus of claim 11, wherein the means for determining the first SNR value comprises:

means for determining the first SNR value utilizing one or more common reference signals.

17. The apparatus of claim 11, wherein the means for determining the first SNR value comprises:

means for comparing a measured SNR value with a threshold value; and means for selecting, for the first SNR value, a first value if the measured SNR value is equal to or greater than the threshold value and selecting a second value if the measured SNR value is smaller than the threshold value.

18. The apparatus of claim 11, wherein the means for determining the first SNR value comprises:

means for utilizing a predefined value for the first SNR value.

19. The apparatus of claim 11, further comprising:

means for obtaining a Doppler value; and means for selecting the first matrix further based at least on the Doppler value.

20. The apparatus of claim 11, wherein the means for determining the first SNR value comprises:

means for determining the first SNR value based on mapping of a modulation and coding scheme.

21. An apparatus for wireless communications, comprising:

logic for determining a first signal to noise ratio (SNR) value for a received signal;

logic for selecting, based on the first SNR value, a first matrix from one or more two-dimensional compressed interpolation matrices, wherein each of the compressed interpolation matrices corresponds to a subset of physical resource blocks (PRBs) in a subframe, and wherein the size of the compressed interpolation matrices is based on a number of dedicated reference signal (DRS) tones in the subframe and a number of symbols in the subset of PRBs; and logic for obtaining a first channel estimation matrix utilizing the received signal and the first matrix.

22. The apparatus of claim 21, wherein the logic for obtaining the first channel estimation matrix comprises:
   logic for obtaining a first plurality of channel estimation values corresponding to the subset of physical resource blocks (PRBs); and
   logic for generating a second plurality of channel estimation values, corresponding to remaining PRBs in the subframe that are not included in the subset of PRBs, by interpolating the first plurality of channel estimation values; and
   logic for generating the first channel estimation matrix comprising the first and the second plurality of channel estimation values.

23. The apparatus of claim 21, further comprising:
   logic for estimating a second SNR value based at least on the first channel estimation matrix;
   logic for selecting a second matrix from the compressed interpolation matrices based on the second SNR value; and
   logic for obtaining a second channel estimation matrix utilizing the second matrix.

24. The apparatus of claim 23, further comprising:
   logic for comparing the first and the second SNR values and selecting the second matrix only if a difference between the first SNR value and the second SNR value is equal to or greater than a threshold value.

25. The apparatus of claim 21, wherein the logic for obtaining the first channel estimation matrix comprises:
   logic for obtaining the first channel estimation matrix utilizing a two-dimensional minimum mean square error (2D-MMSE) algorithm.

26. The apparatus of claim 21, wherein the logic for determining the first SNR value comprises:
   logic for determining the first SNR value utilizing one or more common reference signals.

27. The apparatus of claim 21, wherein the logic for determining the first SNR value comprises:
   logic for comparing a measured SNR value with a threshold value; and
   logic for selecting, for the first SNR value, a first value if the measured SNR value is equal to or greater than the threshold value and selecting a second value if the measured SNR value is smaller than the threshold value.

28. The apparatus of claim 21, wherein the logic for determining the first SNR value comprises:
   logic for utilizing a predefined value for the first SNR value.

29. The apparatus of claim 21, further comprising:
   logic for obtaining a Doppler value; and
   logic for selecting the first matrix further based at least on the Doppler value.

30. The apparatus of claim 21, wherein the logic for determining the first SNR value comprises:
   logic for determining the first SNR value based on mapping of a modulation and coding scheme.

31. An apparatus for wireless communications, comprising at least one processor configured to:
   determine a first signal to noise ratio (SNR) value for a received signal,
   select, based on the first SNR value, a first matrix from one or more two-dimensional compressed interpolation matrices, wherein each of the compressed interpolation matrices corresponds to a subset of physical resource blocks (PRBs) in a subframe, and wherein the size of the compressed interpolation matrices is based on a number of dedicated reference signal (DRS) tones in the subframe and a number of symbols in the subset of PRBs, and
   obtain a first channel estimation matrix utilizing the received signal and the first matrix; and
   a memory coupled to the at least one processor.

32. The apparatus of claim 31, wherein the processor is configured to obtain the first channel estimation matrix by:
   obtaining a first plurality of channel estimation values corresponding to the subset of physical resource blocks (PRBs); and
   generating a second plurality of channel estimation values, corresponding to remaining PRBs in the subframe that are not included in the subset of PRBs, by interpolating the first plurality of channel estimation values; and
   generating the first channel estimation matrix comprising the first and the second plurality of channel estimation values.

33. The apparatus of claim 31, wherein the processor is further configured to:
   estimate a second SNR value based at least on the first channel estimation matrix;
   select a second matrix from the compressed interpolation matrices based on the second SNR value; and
   obtain a second channel estimation matrix utilizing the second matrix.

34. The apparatus of claim 33, wherein the processor is further configured to:
   compare the first and the second SNR values and selecting the second matrix only if a difference between the first SNR value and the second SNR value is equal to or greater than a threshold value.

35. The apparatus of claim 31, wherein the processor is configured to obtain the first channel estimation matrix by:
   obtaining the first channel estimation matrix utilizing a two-dimensional minimum mean square error (2D-MMSE) algorithm.

36. The apparatus of claim 31, wherein the processor is configured to determine the first SNR value by:
   determining the first SNR value utilizing one or more common reference signals.

37. The apparatus of claim 31, wherein the processor is configured to determine the first SNR value by:
   comparing a measured SNR value with a threshold value; and
   selecting, for the first SNR value, a first value if the measured SNR value is equal to or greater than the threshold value and selecting a second value if the measured SNR value is smaller than the threshold value.

38. The apparatus of claim 31, wherein the processor is configured to determine the first SNR value by:
   utilizing a predefined value for the first SNR value.

39. The apparatus of claim 31, wherein the processor is further configured to:
   obtain a Doppler value; and
   select the first matrix further based at least on the Doppler value.

40. The apparatus of claim 31, wherein the processor is configured to determine the first SNR value by:
   determining the first SNR value based on mapping of a modulation and coding scheme.

41. A computer-program product for wireless communications, comprising a non-transitory computer readable medium having instructions stored thereon, the instructions being executable by one or more processors and the instructions comprising:

instructions for determining a first signal to noise ratio (SNR) value for a received signal;

instructions for selecting, based on the first SNR value, a first matrix from one or more two-dimensional compressed interpolation matrices, wherein each of the compressed interpolation matrices corresponds to a subset of physical resource blocks (PRBs) in a subframe, and wherein the size of the compressed interpolation matrices is based on a number of dedicated reference signal (DRS) tones in the subframe and a number of symbols in the subset of PRBs; and instructions for obtaining a first channel estimation matrix utilizing the received signal and the first matrix.

* * * * *